US012226747B2

(12) United States Patent
Dentinger

(10) Patent No.: US 12,226,747 B2
(45) Date of Patent: Feb. 18, 2025

(54) METHODS AND SYSTEMS FOR MONITORING SOLID-PHASE STEPWISE OLIGONUCLEOTIDE SYNTHESIS

(71) Applicant: CENTRILLION TECHNOLOGY HOLDINGS CORPORATION, Grand Cayman (KY)

(72) Inventor: Paul Dentinger, Sunol, CA (US)

(73) Assignee: CENTRILLION TECHNOLOGY HOLDINGS CORPORATION, Grand Cayman (KY)

( * ) Notice: Subject to any disclaimer, the term of this patent is extended or adjusted under 35 U.S.C. 154(b) by 934 days.

(21) Appl. No.: 17/058,287

(22) PCT Filed: May 29, 2019

(86) PCT No.: PCT/US2019/034471
§ 371 (c)(1),
(2) Date: Nov. 24, 2020

(87) PCT Pub. No.: WO2019/232101
PCT Pub. Date: Dec. 5, 2019

(65) Prior Publication Data
US 2021/0197164 A1 Jul. 1, 2021

Related U.S. Application Data

(60) Provisional application No. 62/677,187, filed on May 29, 2018.

(51) Int. Cl.
*B01J 19/00* (2006.01)
*G01N 21/21* (2006.01)

(52) U.S. Cl.
CPC ........ *B01J 19/0046* (2013.01); *G01N 21/211* (2013.01); *B01J 2219/00529* (2013.01); *B01J 2219/00608* (2013.01); *B01J 2219/00612* (2013.01); *B01J 2219/00659* (2013.01); *B01J 2219/00675* (2013.01); *B01J 2219/00693* (2013.01); *B01J 2219/00702* (2013.01); *B01J 2219/00722* (2013.01)

(58) Field of Classification Search
None
See application file for complete search history.

(56) References Cited

U.S. PATENT DOCUMENTS

| | | | |
|---|---|---|---|
| 6,166,198 A | 12/2000 | Livingston | |
| 2003/0157538 A1 | 8/2003 | Krull et al. | |
| 2006/0127369 A1 | 6/2006 | Christensen et al. | |
| 2007/0134699 A1 | 6/2007 | Glover et al. | |
| 2008/0157786 A1* | 7/2008 | Holt et al. ............. | C07H 21/00 324/679 |
| 2009/0270279 A1 | 10/2009 | Jerzy et al. | |

FOREIGN PATENT DOCUMENTS

| | | |
|---|---|---|
| CA | 2208165 A1 | 12/1998 |
| CN | 1190973 A | 8/1998 |
| CN | 106460032 A | 2/2017 |
| EP | 1502961 A1 | 2/2005 |
| WO | WO 1996040708 A2 | 12/1996 |
| WO | WO 1996040708 A3 | 12/1996 |
| WO | WO 2014144383 A1 | 9/2014 |
| WO | WO 2015085275 A2 | 6/2015 |
| WO | WO 2015085275 A3 | 6/2015 |
| WO | WO 2020020608 A1 | 1/2020 |

OTHER PUBLICATIONS

Wang et al., "DNA microarray fabricated on poly(acrylic acid) brushes-coated porous silicon by in situ rolling circle amplification," Analyst 2012, 137:4539-4545. (Year: 2012).*
International Search Report and Written Opinion for corresponding PCT Application No. PCT/US2019/034471 which issued Aug. 16, 2019.
Wang et al., 2012, "DNA microarray fabricated on poly(acrylic acid) brushes-coated porous silicon by in situ rolling circle amplification," Analyst, 137(19):4539-4545.
Wikipedia, 2017, "Carbohydrate," Dec. 20, 2017 [retrieved on Sep. 9, 2024]. Retrieved from the Internet :< URL: https://en.wikipedia.org/w/index.php?title=Carbohydrate&oldid=816295615>(12 pages).
Wikipedia, 2017, "Ellipsometry," Sep. 26, 2017 [retrieved on Sep. 9, 2024]. Retrieved from the Internet :< URL: https://en.wikipedia.org/w/index.php?title=Ellipsometry&oldid=802479081> (9 pages).

\* cited by examiner

*Primary Examiner* — Kaijiang Zhang
(74) *Attorney, Agent, or Firm* — JONES DAY

(57) ABSTRACT

The present disclosure relates to method of monitoring a solid-phase reaction on a surface of a substrate by taking measurements at a plurality of positions on the surface. Properties of the surface are determined based on the measurements taken. Based on the properties determined, the extent of the solid-phase reaction is determined. This method can be achieved by using an ellipsometer and measuring the changes in thickness of the surface before and after the solid-phase reaction.

17 Claims, 12 Drawing Sheets

METHODS AND SYSTEMS FOR MONITORING SOLID-PHASE STEPWISE OLIGONUCLEOTIDE SYNTHESIS

CROSS-REFERENCE TO RELATED APPLICATIONS

This application is a U.S. National Stage Application under 35 U.S.C. § 371 of International Patent Application No. PCT/US2019/034471, filed May 29, 2019, which claims the benefit of U.S. Provisional Patent Application No. 62/677,187, filed May 29, 2018, the disclosure of each of which is incorporated by reference herein in its entirety.

BACKGROUND

Solid-phase synthesis is a method used in combinatorial chemistry to streamline the synthesis of a large number of molecules in a short period of time on the surface of a substrate. A set of steps may be repeated for each cycle of the solid-phase synthesis to generate libraries of molecules. The molecules synthesized may include polypeptides, oligosaccharides, and oligonucleotides. Solid-phase synthesis may involve the use of a resin, which is a non-soluble, polymer-based material. The resin may be pre-functionalized so that the starting building block, for example, the individual amino acid, monosaccharide, or nucleic acid, can easily bind. Each of the ensuing building blocks may be protected; once added onto the resin, the building block can be deprotected and treated with the next desired building block. Once the desired full-length molecule has been synthesized, it can be cleaved from the resin. For example, solid-phase synthesis of peptides using 9-fluorenylmethyloxycarbonyl group (Fmoc) and t-butyloxycarbonyl (Boc) protecting groups has been employed to synthesize peptides from the carbonyl group side (C-terminus) to amino group side (N-terminus) of the peptide chain.

Hi-density DNA microarrays have seen extensive use in a range of applications for genomic sequence analysis, including the detection and analysis of mutations and polymorphisms (SNP genotyping), cytogenetics (copy number), nuclear proteomics, gene expression profiling, and transcriptome analysis.

One method for the fabrication of very high density DNA microarrays combines in situ synthesis with photo-lithographic semiconductor manufacturing methods to provide arrays with high density DNA sequences on the substrate. The photolithographic methods can result in a population of incomplete or truncated probe sequences which accompany the probe sequences synthesized at the full desired or intended length ("full-length" probes). The presence of such truncated probe sequences can have a detrimental effect on array performance, for example, in hybridization reactions to contribute to a poor signal-to-noise ratio (SNR). The photo-lithographic method permits efficient oligonucleotide synthesis in the 3' to 5' direction with the 3'-terminus of the synthesized probe bound to the solid support (5' up microarrays).

SUMMARY

It can be desirable monitor the extent of each step of a solid-phase synthesis to determine whether the expected reaction has occurred at the correct locations on the surface of the substrate. In addition, it is desirable to determine the uniformity at each step of the solid-phase synthesis so that the overall results can be improved or the problem can be detected early in the stepwise synthesis to save labor and/or cost.

During the solid-phase synthesis, the quality of adding each block needs to be monitored in real time, if possible and to be qualified or quantified at the reaction sites. Therefore, methods for monitoring in situ solid-phase polymer synthesis are needed. In particular, there is a great need for in-line monitoring tools for detecting synthesis issues during photolithographic patterned synthesis of oligonucleotides or peptides In one aspect, the present disclosure provides a method of monitoring a solid-phase reaction on a surface of a substrate, comprising: (a) taking a first measurement of a property of the surface at a plurality of positions on the surface before a first reaction on the surface; (b) taking a second measurement of the property of the surface at the plurality of positions on the surface after the first reaction on the surface; and (c) determining a first quality of the first reaction on the surface based on the first measurement and the second measurement.

In some embodiments of aspects provided herein, the method further comprises: (d) conducting a second reaction on the surface; (e) taking a third measurement of the property of the surface at the plurality of positions on the surface after the second reaction on the surface; and (f) determining a second quality of the second reaction on the surface based on the second measurement and the third measurement.

In some embodiments of aspects provided herein, the solid-phase reaction is for the synthesis of a polymer, a polypeptide, an oligosaccharide, or an oligonucleotide. In some embodiments of aspects provided herein, the solid-phase reaction is for the synthesis of the polypeptide. In some embodiments of aspects provided herein, the solid-phase reaction is for the synthesis of the oligosaccharide. In some embodiments of aspects provided herein, the solid-phase reaction is for the synthesis of the oligonucleotide. In some embodiments of aspects provided herein, the first measurement is thickness. In some embodiments of aspects provided herein, the second measurement is thickness. In some embodiments of aspects provided herein, the first measurement and the second measurement are measured by an optical instrument. In some embodiments of aspects provided herein, the third measurement is measured by the optical instrument.

In some embodiments of aspects provided herein, the first measurement and the second measurement are measured by an ellipsometer. In some embodiments of aspects provided herein, the third measurement is measured by the ellipsometer. In some embodiments of aspects provided herein, the third measurement is thickness. In some embodiments of aspects provided herein, the first quality of the first reaction is yield of the first reaction at each of the plurality of the positions, uniformity of the first reaction at each of the plurality of the positions, whether the first reaction provides the correct product at each of the plurality of the positions, or whether the first reaction is conducted at each of the plurality of the positions. In some embodiments of aspects provided herein, the determining in (c) is based on a first difference between the first measurement and the second measurement. In some embodiments of aspects provided herein, the first difference has a first signal to noise ratio (SNR) better than 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, or 30:1. In some embodiments of aspects provided herein, the first difference has a first signal to noise ratio (SNR) of about 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, or 30:1.

In some embodiments of aspects provided herein, the determining in (f) is based on a second difference between the second measurement and the third measurement. In some embodiments of aspects provided herein, the second difference has a second signal to noise ratio (SNR) better than 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, or 30:1. In some embodiments of aspects provided herein, the second difference has a second signal to noise ratio (SNR) of about 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, or 30:1.

In some embodiments of aspects provided herein, the first SNR can be improved by using a laser source of a different wavelength. In some embodiments of aspects provided herein, the substrate is silicon (Si) or quartz (Qz). In some embodiments of aspects provided herein, the first reaction uses dimethoxytrityl (DMT)-related chemistry or photo chemistry. In some embodiments of aspects provided herein, the second reaction uses the dimethoxytrityl (DMT)-related chemistry or the photo chemistry. In some embodiments of aspects provided herein, the first reaction and the second reaction use dimethoxytrityl (DMT)-related chemistry. In some embodiments of aspects provided herein, the first reaction and the second reaction use photo chemistry. In some embodiments of aspects provided herein, the first reaction and the second reaction use the same synthetic procedure. In some embodiments of aspects provided herein, the first reaction and the second reaction use different synthetic procedure. In some embodiments of aspects provided herein, the second quality of the second reaction is yield of the second reaction at each of the plurality of the positions, uniformity of the second reaction at each of the plurality of the positions, whether the second reaction provides the correct product at each of the plurality of the positions, or whether the second reaction is conducted at each of the plurality of the positions In some embodiments of aspects provided herein, the solid-phase reaction is terminated based on the first quality and/or the second quality. In some embodiments of aspects provided herein, the solid-phase reaction continues based on the first quality and/or the second quality. In some embodiments of aspects provided herein, the first measurement, the second measurement, and/or the third measurement are taken in-line of the solid-phase reaction on the surface. In some embodiments of aspects provided herein, the first measurement, the second measurement, and/or the third measurement are taken in-situ of the solid-phase reaction on the surface. In some embodiments of aspects provided herein, the first measurement, the second measurement, and/or the third measurement are taken in real-time of the solid-phase reaction on the surface. In some embodiments of aspects provided herein, the ellipsometer is an imaging ellipsometer. In some embodiments of aspects provided herein, the second SNR can be improved by using a laser source of a different wavelength. In some embodiments of aspects provided herein, the first SNR and/or the second SNR can be improved by varying wavelength, angle of incidence, source bandwidth for the ellipsometer.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
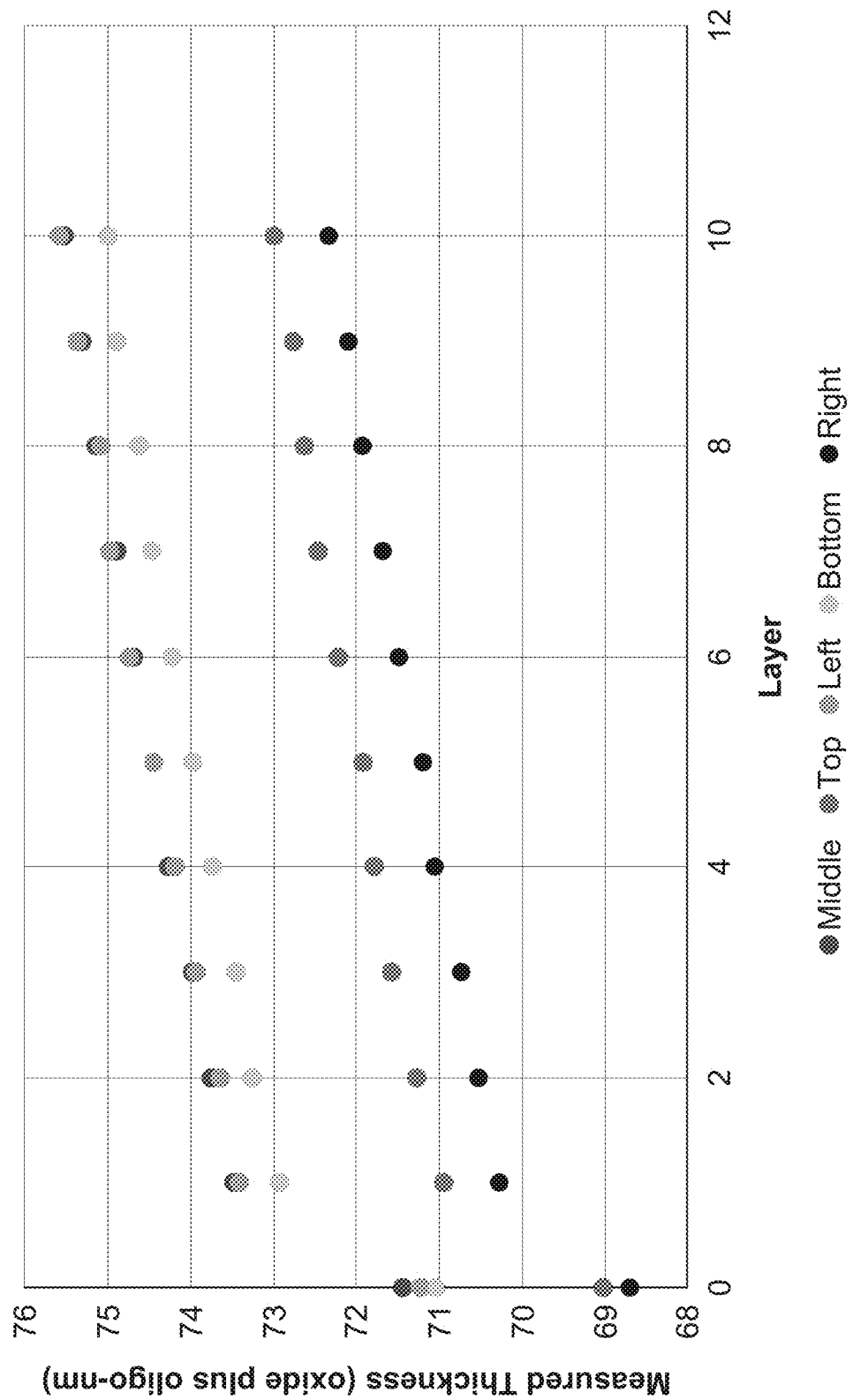
FIG. 1 shows the measurement of thickness when ten nucleotides are added stepwise.

DNA oligonucleotide microarrays have been fabricated on a commercial scale by direct, in-situ synthesis on chip substrates using photolithography (See Pawloski et al., "Photolithographic synthesis of high-density DNA probe arrays: Challenges and opportunities;" *Journal of Vacuum Science & Technology B: Microelectronics and Nanometer Structures* 2007, 25: 253), inkjet printing (LeProust et al., "Synthesis of high-quality libraries of long (150mer) oligonucleotides by a novel depurination controlled process;" *Nucleic Acids. Res.* 2010, 38(8): 2522-2540), or electrochemistry (Liu et al., "Integrated microfluidic biochips for DNA microarray analysis;" *Expert Rev of Mol Diagn* 2006, 6: 253-261), all of which are incorporated herein by reference. See also, Pease et al. (1994) "Light-generated oligonucleotide arrays for rapid DNA sequence analysis;" Proc Natl Acad Sci USA 91: 5022-5026.; Singh-Gasson et al. "Maskless fabrication of light-directed oligonucleotide: microarrays using a digital micromirror array;" Nature Biotechnology 1999, 17, 974-978; Hughes et al. (2001) "Expression profiling using microarrays fabricated by an ink-jet oligonucleotide synthesizer;" Nat Biotechnol 19: 342-347; Lausted et al. (2004) "POSaM: a fast flexible open-source inkjet oligonucleotide synthesizer and microarrayer;" Genome Biol 5: R58; and Gunderson et al. "Decoding Randomly Ordered DNA Arrays;" Genome Res. 2004. 14, 870-877; all of which are incorporated herein by reference.

Custom microfabrication strategies may come with the risk that every portion of the manufacturing process may necessitate a new tool or process for the job at hand. This may require real-time, in-situ, or in-line process monitors, which may have extreme importance to manufacturing of high-value-add articles. To date, there are limited methods for real-time, in-situ, and/or in-line quality control (QC) of the processes for solid-phase synthesis of molecules, including polypeptides, oligosaccharides, and oligonucleotides. Thus, there is a need to develop a real-time, in-situ, and/or in-line quality control (QC) of the processes for solid-phase synthesis.

Synthesis of the oligonucleotides typically can proceed with the addition of monomers in the 3'-to-5' direction, using standard 3'-phosphoramidite reagents and solid-phase synthesis protocols (e.g., M. Egli, et al., ed. "Current Protocols in Nucleic Acid Chemistry," John Wiley & Sons). The synthesis proceeds in the 3' to 5' direction (solid-phase oligonucleotide synthesis in the 5'-to-3' direction, while feasible, is much less efficient and economical, providing lower yields and product purity). However, the resulting probes can be attached to the substrate at the 3'-terminus, and any truncated sequence impurities which arise during the synthesis remain on the support, which may be a particular issue in the case of photolithographic synthesis (J. Forman, et al., *Molecular Modeling of Nucleic Acids*, Chapter 13, p. 221, *American Chemical Society* (1998) and G. McGall, et al., *J. Am. Chem. Soc.* 119.5081-5090 (1997)). The main impurities are truncated, partial-length sequences resulting from incomplete monomer coupling and, to a lesser extent, depurination reactions. Despite the above limitation, photolithographic synthesis is a highly attractive means of fabricating very high-density DNA arrays, as it is capable of exceeding 10 million arrayed sequences per $cm^2$ (A. R. Pawloski, et al., *J Vac Sci Technol B* 2007, 25, 2537-46), and is highly scalable in a manufacturing setting. Therefore, in-line monitoring of the solid-phase synthesis is desirable.

The plurality of probes can be located in one or more addressable regions (spots, locations, etc.) on a solid substrate, herein generally referred to as "pixels." In some cases, a solid substrate comprises at least about 2, 3, 4, 5, 6, or 7-10, 10-50, 50-100, 100-500, 500-1,000, 1,000-5,000, 5,000-10,000, 10,000-50,000, 50,000-100,000, 100,000-500,000, 500,000-1,000,000 or over 1,000,000 pixels with probes. In some cases, a solid substrate comprises at most about 2, 3, 4, 5, 6, or 7-10, 10-50, 50-100, 100-500, 500-1,000, 1,000-5,000, 5,000-10,000, 10,000-50,000, 50,000-100,000, 100,000-500,000, 500,000-1,000,000 or over 1,000,000 pixels with probes. In some cases, a solid substrate comprises about 2, 3, 4, 5, 6, or 7-10, 10-50, 50-100, 100-500, 500-1,000, 1,000-5,000, 5,000-10,000, 10,000-50,000, 50,000-100,000, 100,000-500,000, 500,000-1,000,000 or over 1,000,000 pixels with probes.

In some cases it is useful to have pixels which do not contain probes. Such pixels can act as control spots in order to increase the quality of the measurement, for example, by using binding to the spot to estimate and correct for non-specific binding. In some cases, the density of the probes can be controlled to either facilitate the attachment of the probes or enhance the ensuing detection by the probes.

In some examples, it is useful to have redundant pixels which have identical probe sequences to another pixel but physically may not be adjacent or in proximity to the other pixel. The data acquired by such probe arrays may be less susceptible to fabrication non-idealities and measurement errors.

In some cases, labels are attached to the probes within the pixels, in addition to the labels that are incorporated into the targets. In such systems, captured targets can result in two labels coming into intimate proximity with each other in the pixel. As discussed before, interactions between specific labels can create unique detectable signals. For example, when the labels on the target and probe, respectively, are fluorescent donor and acceptor moieties that can participate in a fluorescent resonance energy transfer (FRET) phenomenon, FRET signal enhancement or signal quenching can be detected.

In one aspect of the invention, a method for real-time, in-situ, and/or in-line process monitoring for oligonucleotide, oligosaccharide or peptide synthesis is provided. To simply the description of the method, oligonucleotide synthesis may be used in the examples. The same QC method for real-time, in-situ, and/or in-line process monitoring may be used to monitor other polymer synthesis, including those for polypeptides and oligosaccharide.

In some cases, through experiments, we have discovered that ellipsometry can be used for monitoring the attachment (via chemical bond formation, e.g., covalent bond formation) of a mono-block unit to a growing chain or chains of molecules on the surface at selected stage or time before the completion of the molecule synthesis. The stepwise addition of the mono-block unit, for example, a nucleotide or an amino acid (in the case of peptide synthesis) unit, can be monitors with an in-line compatible technique such as ellipsometry. Such monitoring method can provide the sensitivity and speed for the purposes of monitoring the solid-phase synthesis of the molecules without labelling the unit (e.g., putting a label (a fluorescent label or other labels) on the last mono-block unit added to the final product, or using mass spectroscopy to determine the molecular weight at intermediate stage of the final stage of the synthesis, or relying on momentum contact of the growing chains (e.g, the oligonucleotide chain).

In some cases, an imaging ellipsometer (e.g., those from Accurion (Gottingen, Germany)) can provide trade-offs between sensitivity, accuracy, precision, and speed when determining physical and optical properties of a surface. This may make it a suitable choice for real-time, in-situ, or in-line monitoring of the solid-phase synthesis process. For example, in case of oligonucleotide synthesis, the signal to noise ratio (SNR) for the measurement of a single base using ellipsometer can be better than 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, or 30:1. SNR of an image may be calculated as the ratio of the mean pixel value to the standard deviation of the pixel values over a given neighborhood. Using an imaging ellipsometer can determine not only whether a base is attached to the growing chain, but whether the correct base is attached with the correct concentration and at the correct location. Within a selected time frame, for example, less than 20, 15, 10, 9, 8, 7, 6, 5, 4, 3, or 2 minutes, multiple locations (for example, 10, 9, 8, 7, 6, 5 or 4 locations) on the substrate (for example, a wafer) can be mapped by an imaging ellipsometer. Doing so can provide uniformity and accurate overlay with enough precision to support high resolution lithography, and may identify issues with the synthesis processes during the synthesis and well before the expensive labor and other assays are applied near or at the end of the solid-phase synthesis. Both silicon (Si) and quartz (Qz) substrates for solid-phase synthesis can be analyzed using the ellipsometer to monitor the synthesis processes.

Real-time, in-situ, or in-line monitoring can be done using ellipsometry with enough speed and precision to monitor solid-state synthesis, and with reduced or little perturbation of the sample as possible. Optical techniques may be used for in-line monitoring schemes because photons may perturb the sample in very limited ways.

Ellipsometry may have the advantage of non-contact and may interact with non-valence bound electrons on the surface. This can be one reason to explain why ellipsometry may be minimally perturbative to the samples. Spectroscopic ellipsometry may use a rotating compensator technique in its common form. It may be fast and sensitive, and may provide for accurate readings on the properties of the testing materials due to curve fittings at many wavelengths. However, solid-phase synthesis process can be spatially dependent, for example, different locations of the surface may have growing chains of the molecules at different length or have control spots (or blank spots) on the surface that have no attachment of the molecules or the attachment of a control molecule, etc. As such, monitoring can be difficult (hence limited) with bulk incident beams.

However, in-line process monitoring is more about precision than about accuracy. As such, an imaging ellipsometer, with the ability to monitor not only what has been put down, but where it has been put down can have value even if the method may give up some accuracy on the determined materials properties. This trade-off of precision vs accuracy can provide a better technique for in-line monitoring of solid-phase synthesis.

Example 1: Using Ellipsometer to Monitor Oligonucleotide Synthesis Using DMT-T

In this experiment, a JA Woollam alpha-SE ellipsometer and a Si wafer as the substrate was used, a single thymine deoxyribonucleotide (T) was put down over the substrate stepwise for ten (10) bases using the dimethoxytrityl (DMT) protecting group, and measured at 5 locations around the wafer. FIG. 1 shows that ten T's were put on a wafer and ellipsometry was used to measure the thickness after the addition of each base at 5 different points across the wafer. The offset between the curves may be due to the significant oxide variation. But the slopes of each curve at each spot may be the same. The difference in terms of added thickness between the addition of the first base and the other bases is not known.

As shown in FIG. 1, the added thickness can correlate with or track each added base (T), thereby supporting that the ellipsometry may have the sensitivity to monitor the addition of a single base to a growing oligonucleotide. Each curve in FIG. 1 can be seen to track with each other, thereby showing that even a single point measurement can be reasonable precise, and the offset between curves can be due to the oxide film variation. This may be an important point, in that the background of the measurement can be made at either the exact location of the prior measurement or be collocated such that oxide variation may not affect the measurement. From FIG. 1, it is shown that a polyT10 chain can be made on a wafer with DMT chemistry. The determined measurements can be used to estimate that the polyT16 chain synthesized with DMT-T process can be approximately 5.38 nm in thickness, as measured with the Woollam ellipsometer.

Example 2: Using Ellipsometer to Monitor Oligonucleotide Synthesis Using Photo-T The disclose methods can determine improvements or degradations to the solid-phase synthesis processes. In this experiment, the Photo-T was used to add twelve (12) photo-T's to the Si wafer and thicknesses at 3 different positions were taken after each addition of photo-T. During the synthesis when deprotecting photo-T, half of the Si wafer was exposed to 1800 mJ/cm$^2$ radiation and the other half of the Si wafer was exposed to 3600 mJ/cm$^2$ radiation.

Figure 2:
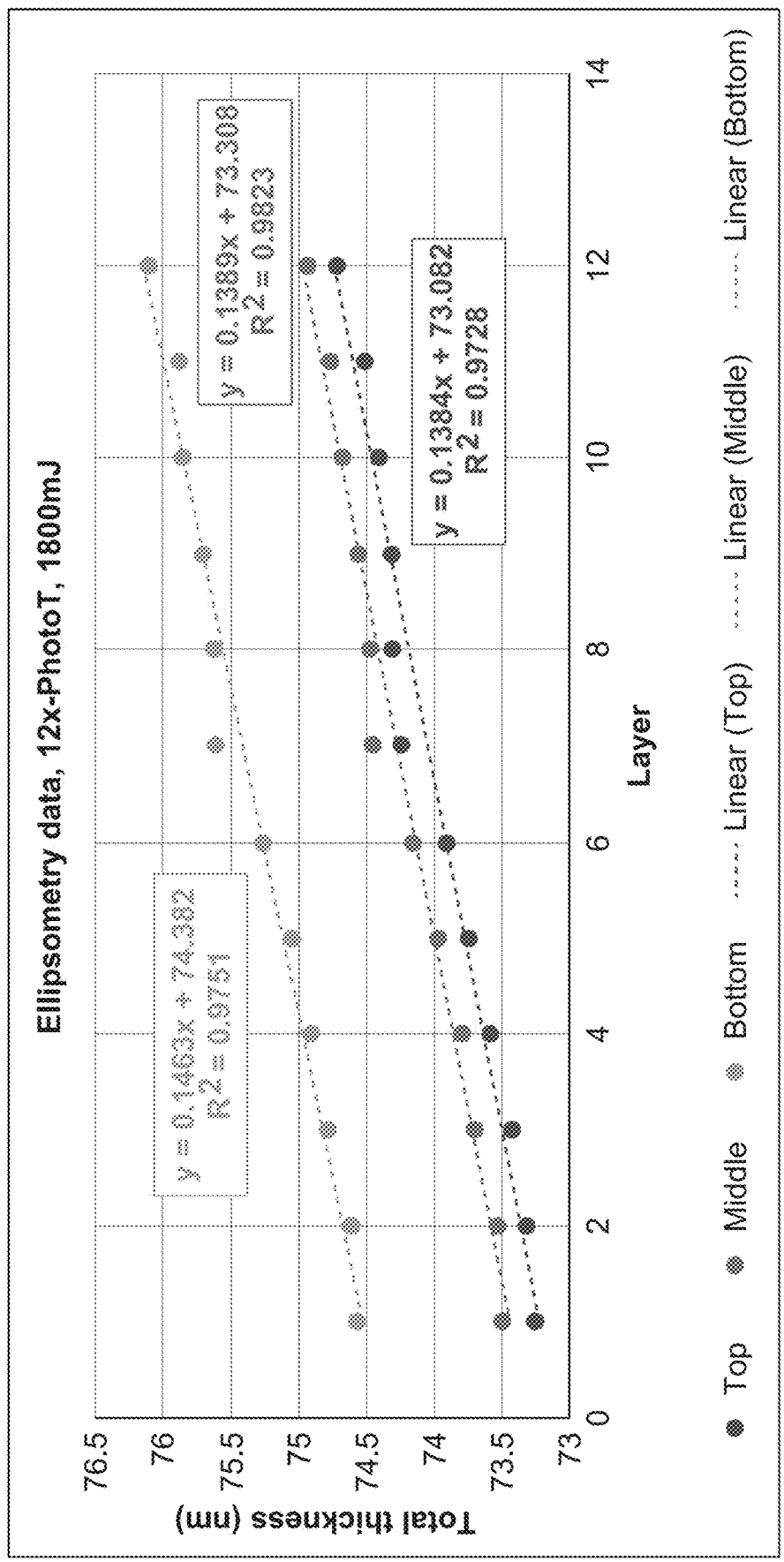
FIG. 2 shows measurement of thickness when twelve nucleotides are added stepwise.
Figure 3:
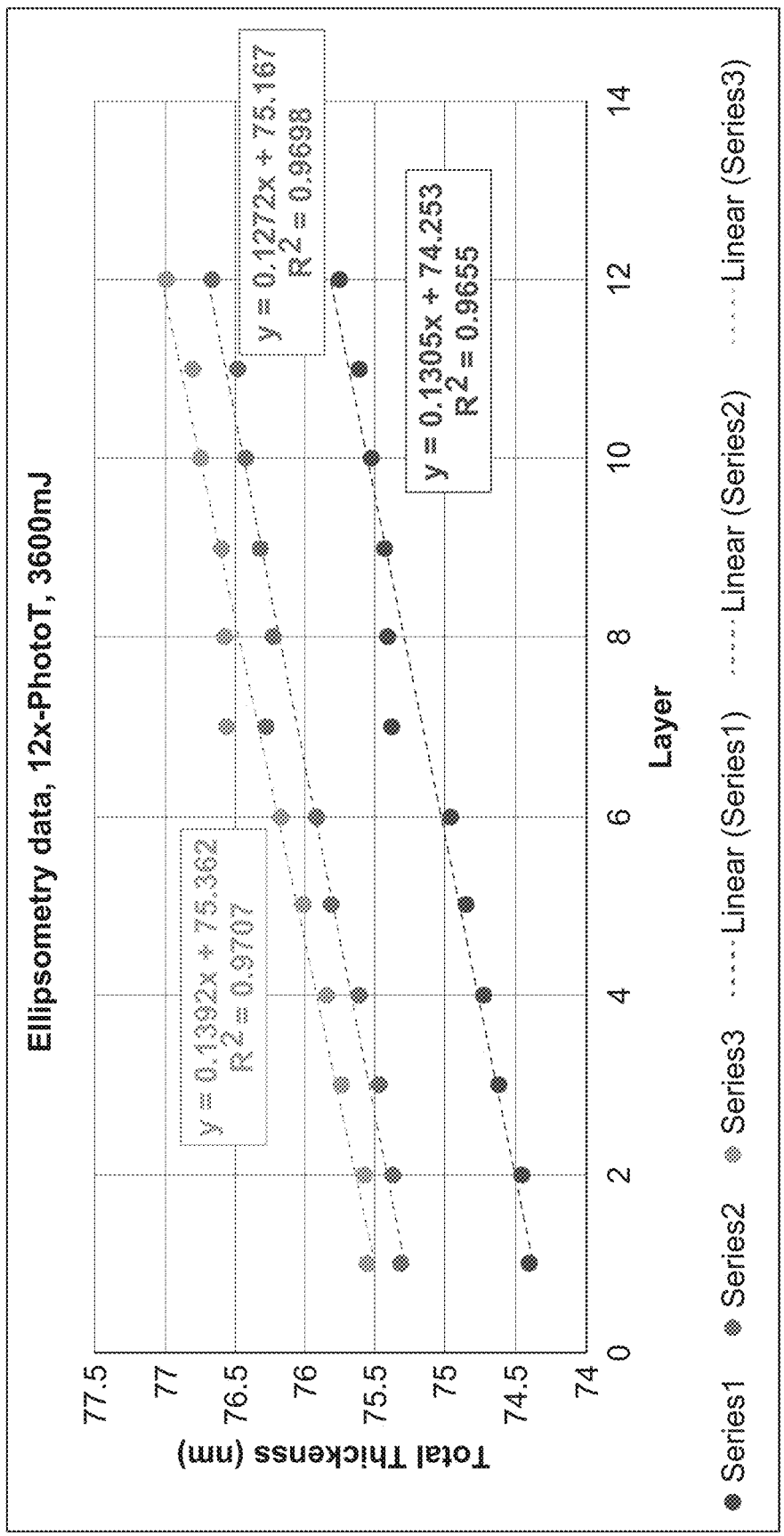
FIG. 3 shows another measurement of thickness when twelve nucleotides are added stepwise.

FIGS. 2 and 3 show the thickness measures for the 1800 mJ/cm$^2$ dose radiation, and 3600 mJ/cm$^2$ dose radiation, respectively. Again, the offset from the curves can be from oxide variations, but the trends may be the same as in the DMT-T experiment. The slope of the thickness curve at 3600 mJ/cm$^2$ dose may be statistically lower than that at 1800 mJ/cm$^2$ dose. This difference in the slopes of the thickness curves may be consistent with other measurements. The higher dose may provide for statistically less signal per layer than the lower dose. This may be explained by the half-lives of these radiation doses and/or the photo-damage done at different doses. The slopes of the thickness curves on the Si wafers when using photo-T were overall lower than those on the Si wafers when using DMT-T. This may be consistent with the lower per layer yields when using photo-T than when using DMT-T. This can be explained as having lower coupling yields from the Photo-T process than from the DMT-T process. But this can also be explained by a lower silane yield (later referred to as lower "fill factor") for the photo-T process. Interestingly, layer 7 in both FIGS. 2 and 3 may be statistically higher than the other points on every single line. When adding this layer, the operator took a lunch break and the reaction time was longer for the layer 7 addition than any other layer addition. This may indicate the precision of the disclosed monitoring technique for solid-phase synthesis.

Figure 4:
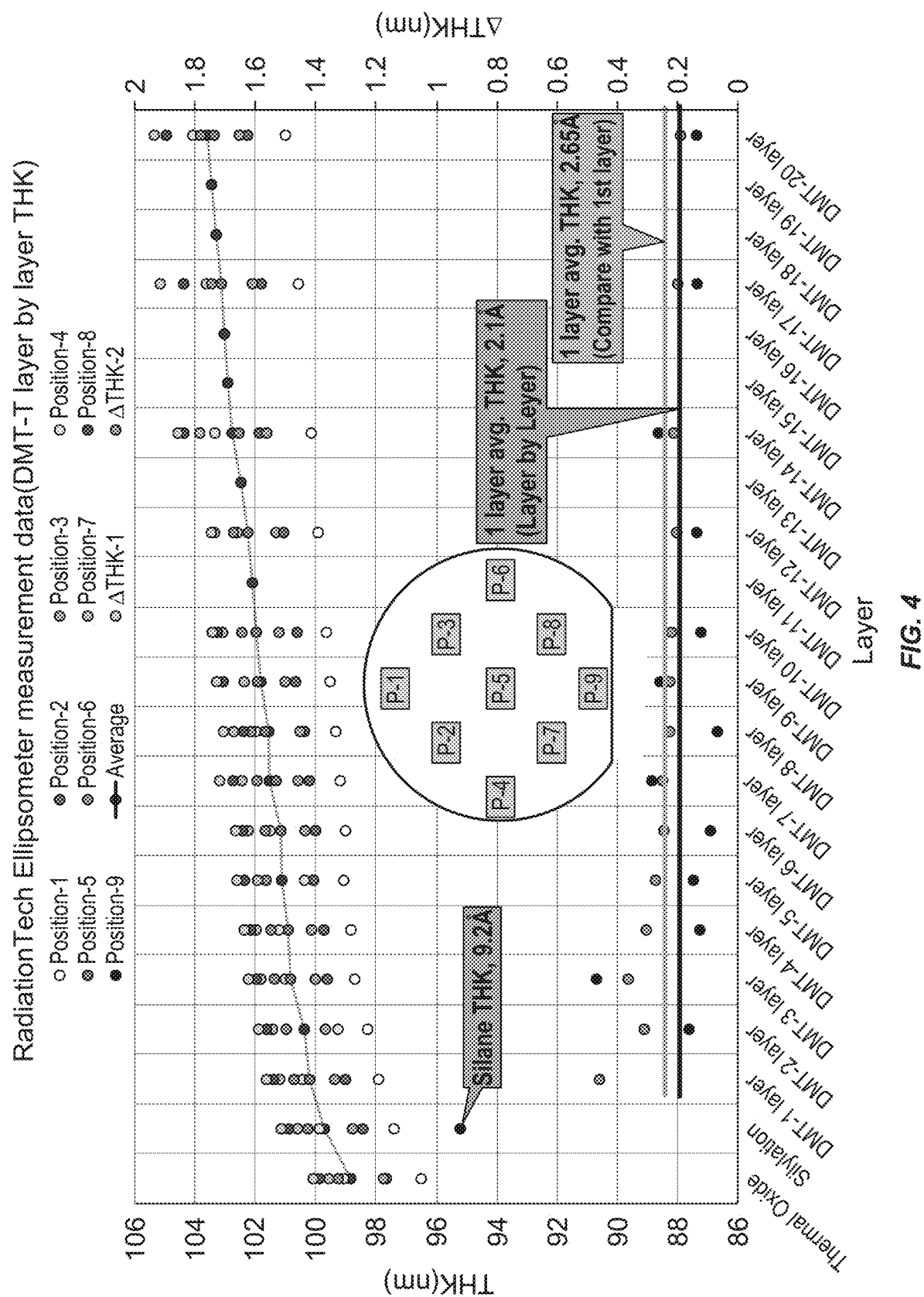
FIG. 4 shows the measurement of thickness when twenty nucleotides are added stepwise.

Example 3: Using Another Ellipsometer to Monitor Oligonucleotide Synthesis Using DMT-T To further demonstrate the use of ellipsometry in solid-phase synthesis, 20 T's were synthesized on Si wafers using DMT-T process and measured by a different ellipsometer, a Radtech ellipsometer, and by different operators. Measurements at nine different positions were made after each DMT-T addition. FIG. 4 shows the results. As shown in FIG. 4, about 0.265 nm/layer can be obtained for the addition of each T. While the absolute measurement of the thickness in Example 3 may be differ from that in Example 1, the differences in the absolute measurement may be due to the differences in fitting optical models. Nonetheless, the conclusion remains the same that the ellipsometer, as evidenced by the monotonically increasing measurement, can be sensitive and capable of in-line detection of oligo array manufacturing.

According to Examples 1-3, the rotating compensator ellipsometer may provide ample sensitivity to detect single base additions. However, the technique as applied by using the alpha-SE ellipsometer may be somewhat slow and may give up a significant area per wafer reserved for QC due to the machine requirement for the α-SE ellipsometer. Hence, an imaging ellipsometer with automated stage was evaluated further.

Example 4: Using Imaging Ellipsometer to Monitor Oligonucleotide Synthesis

Figure 5:
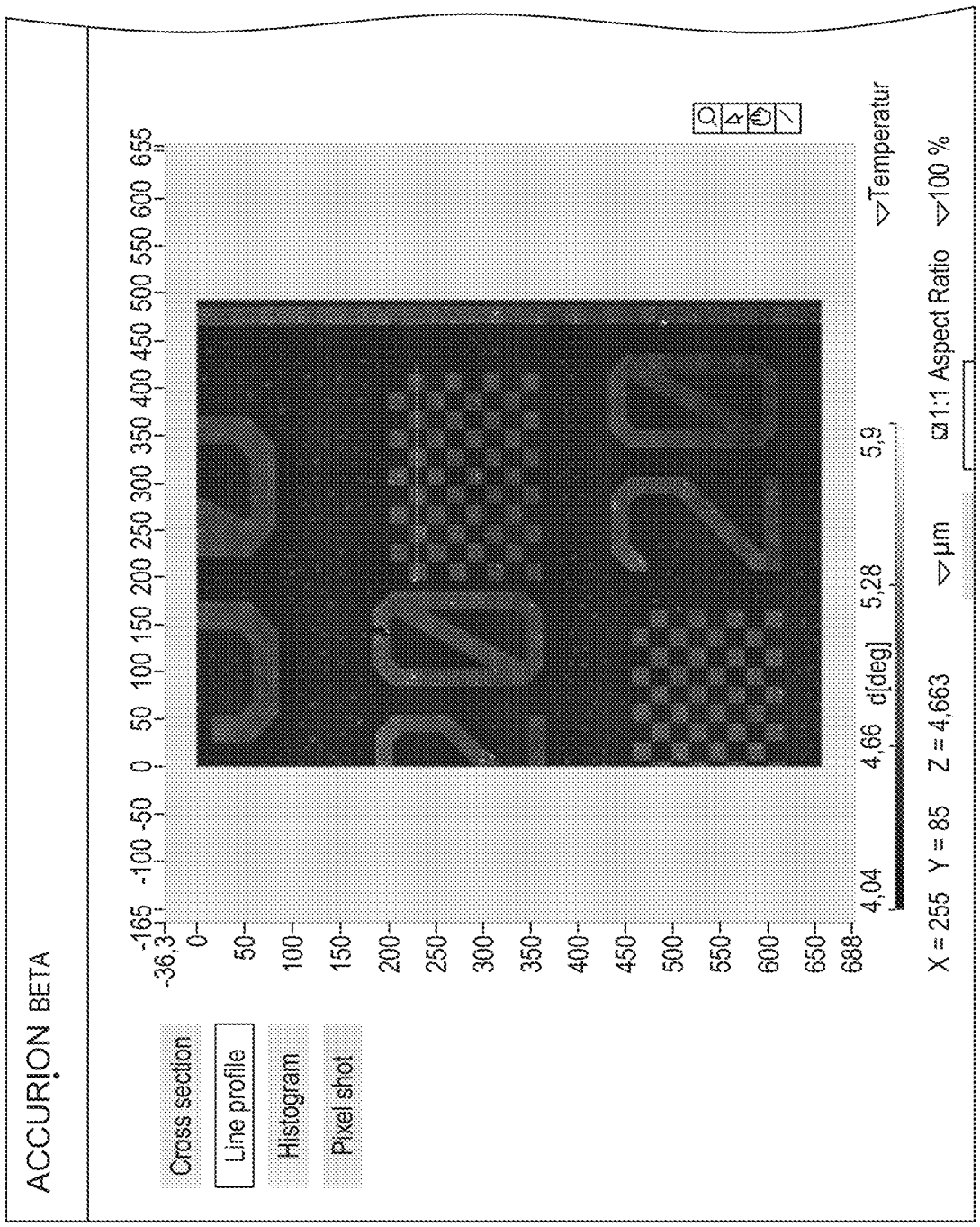
FIG. 5 shows the measurement of thickness when nucleotides are added according to a resolution test pattern.
Figure 5:
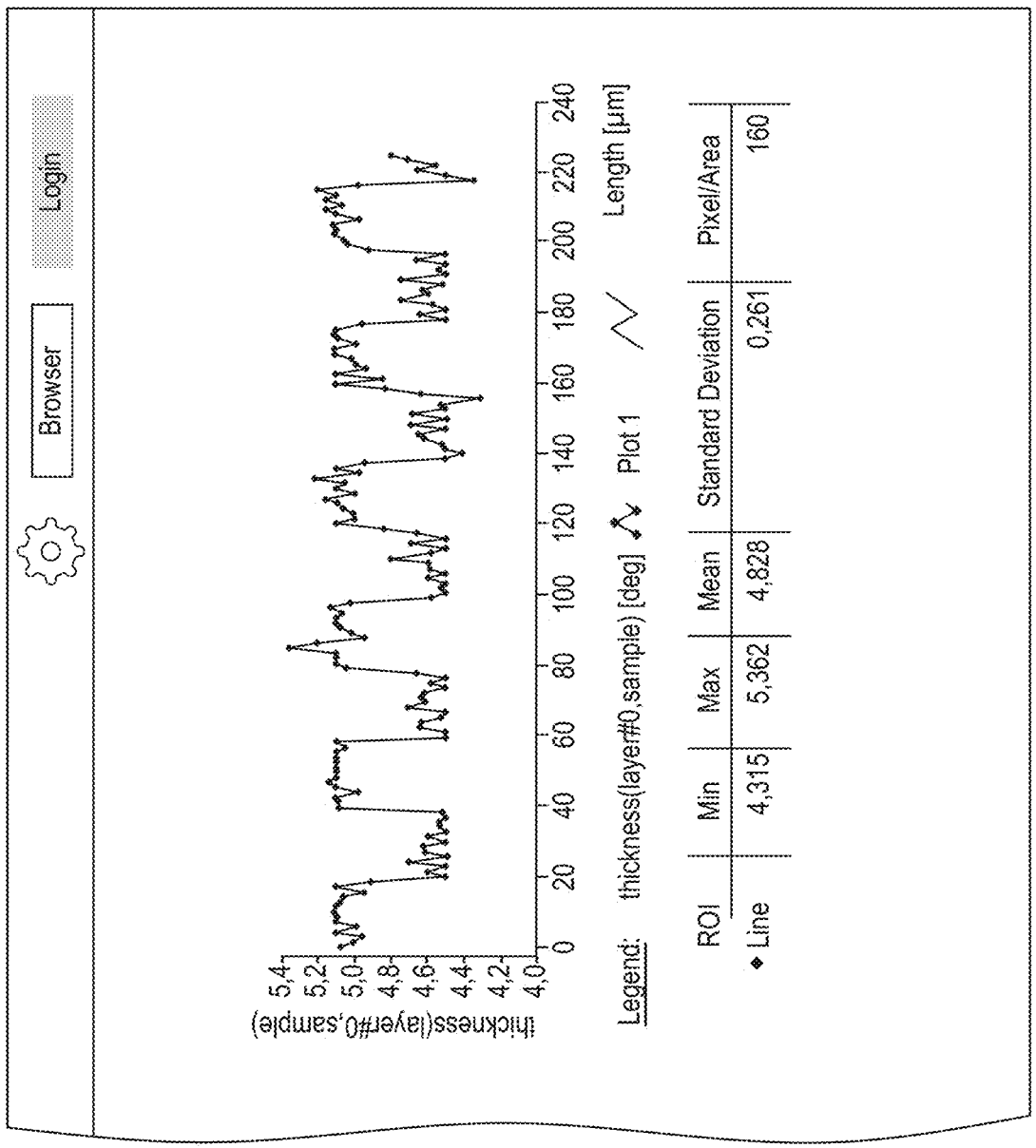
Figure 6:
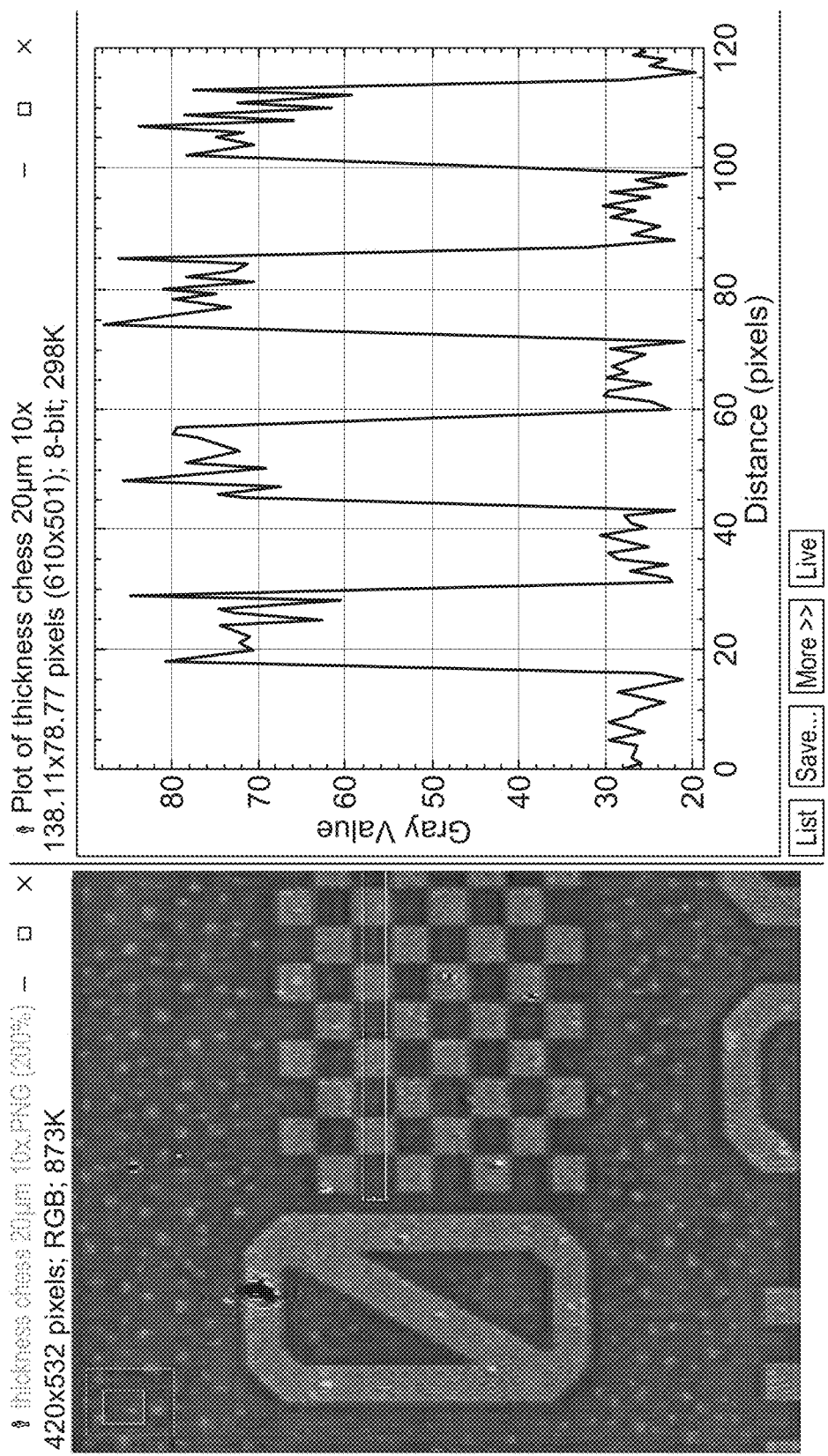
FIG. 6 shows another measurement of thickness when nucleotides are added according to a resolution test pattern.

In this experiment, four DMT-T's were placed on a Si wafer. Subsequently a single Photo-T was added to the end of the four T's on the surface. Then a lab-based exposure of the last Photo-T was performed using a mask having a 20 μm "checkerboard" pattern. Hence, the maximum contrast can be only a single base minus the thickness of the DMT group. FIG. 5 shows the results of this experiment when imaged after using 20 μm "checkerboard" resolution test pattern. In this experiment, the measurement can provide about 15:1 SNR, in approximately a 10 s measurement. Other SNR's can be obtained due to different configuration of the ellipsometers. FIGS. 5 and 6 show the results of this experiment. Images were obtained from an Accurion imaging ellipsometer nanofilm ep4. FIG. 5 shows the resolution test pattern and the thickness measurements at a line across the resolution test pattern. The thickness of the last T added can be estimated as approximately 0.47 nm in thickness at the conditions used. The random "bumps" observed in FIG. 5 may remain unexplained, but they may be protrusions, not pits. FIG. 6 shows an amplified image of the same experiment at another line across the resolution test pattern with the thickness displayed as gray values. As shown in FIG. 6, the signal may be approximately 50 while the standard deviation of noise may be about 3.5.

Figure 7:
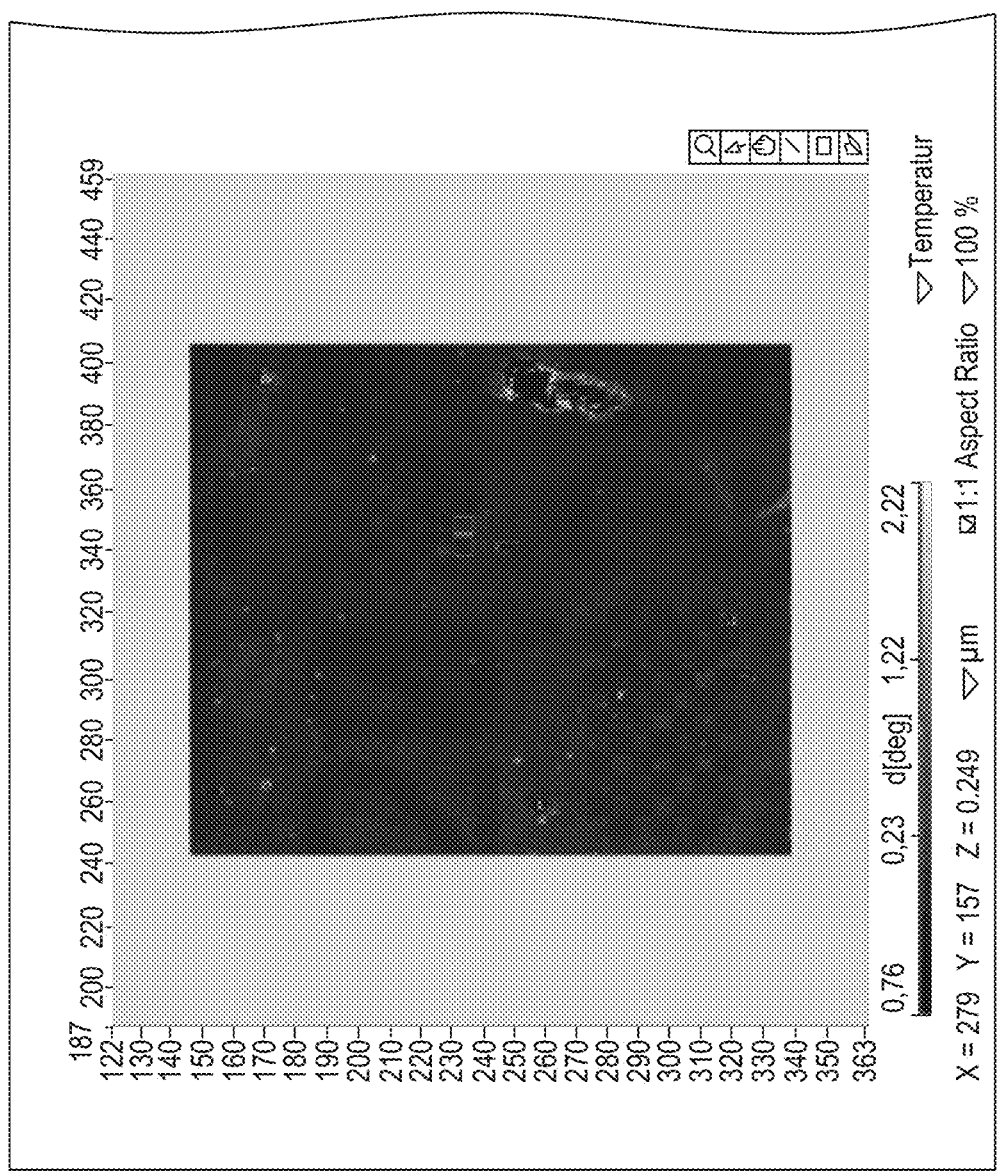
FIG. 7 shows still another measurement of thickness when nucleotides are added according to a resolution test pattern.
Figure 7:
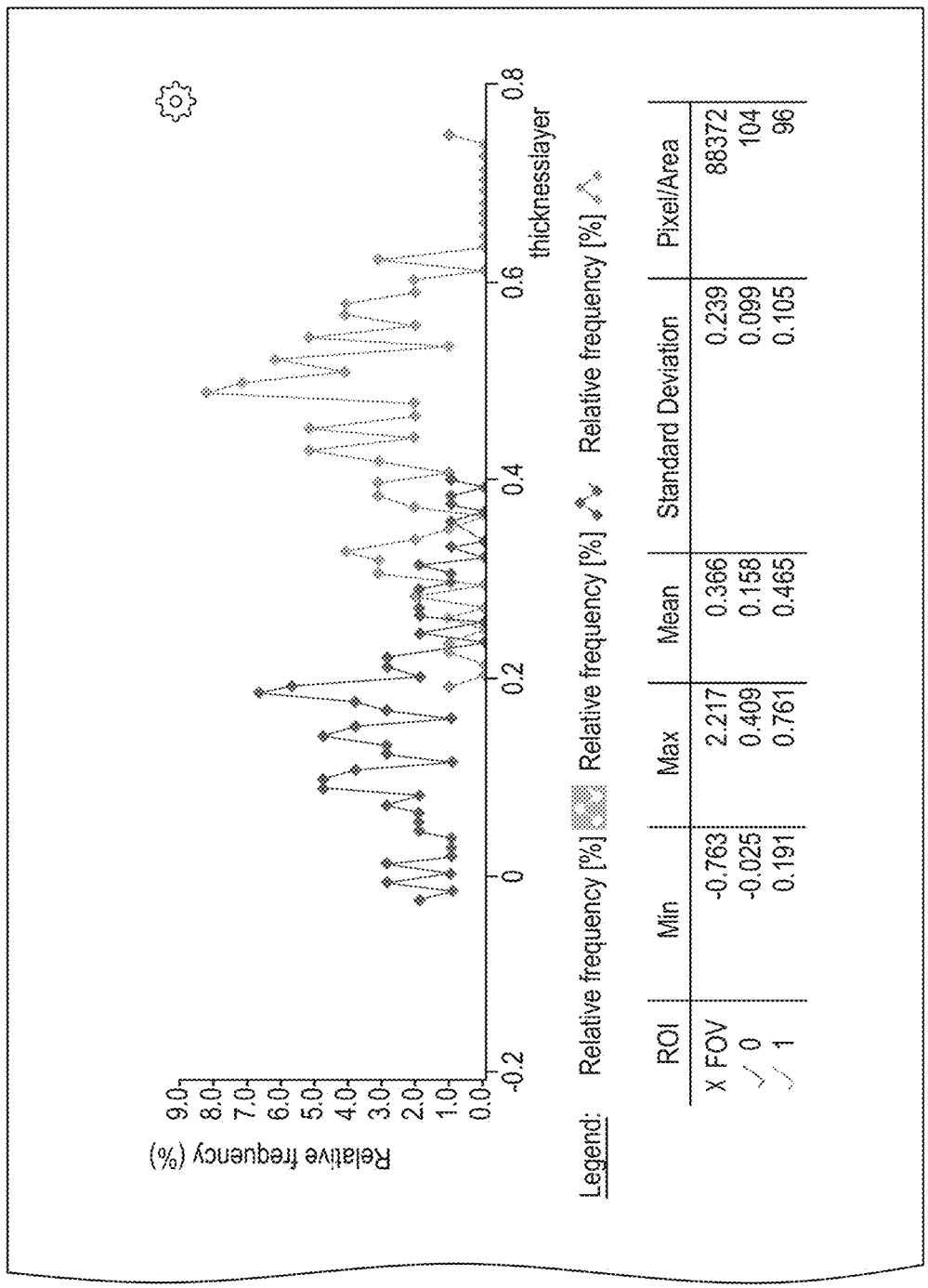

Example 5: Using Imaging Ellipsometer to Monitor Another Oligonucleotide Synthesis It may appear that the imaging ellipsometer can be sensitive enough to determine whether a base has been applied, and potentially even sensitive enough to determine whether it can be the correct base in Example 5. In this case, the 4 DMT-Ts were applied as in Experiment 4 with a Photo-T, and the Photo-T was exposed, but no coupling step occurred. FIG. 7 shows the results of this experiment. As expected, the exposed region showed a loss in "thickness" of approximately 0.3 nm which can be detectable.

All of the samples shown above in Examples 1-5 were on the 65 nm oxide on Si wafer, which can be a substrate for ellipsometry as it can be reflective and smooth.

Example 6: Using Ellipsometer on Quartz Substrates at Different Wavelengths

Figure 8:
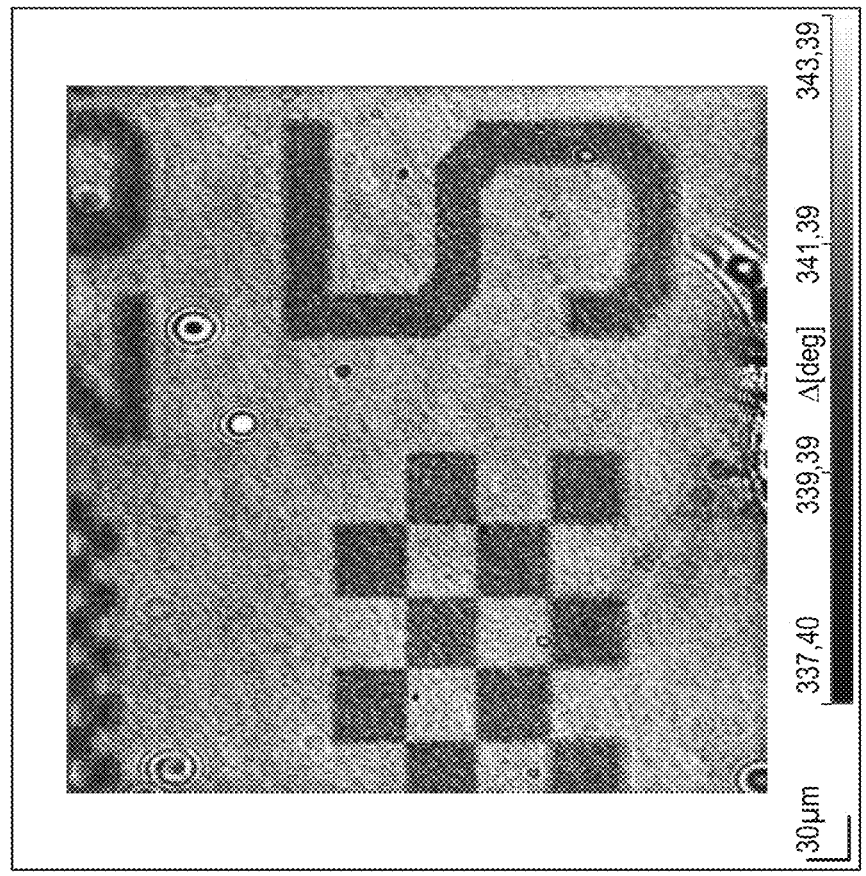
FIG. 8 shows measurement of thickness when nucleotides are added to a quartz wafer according to a resolution test pattern.
Figure 8:
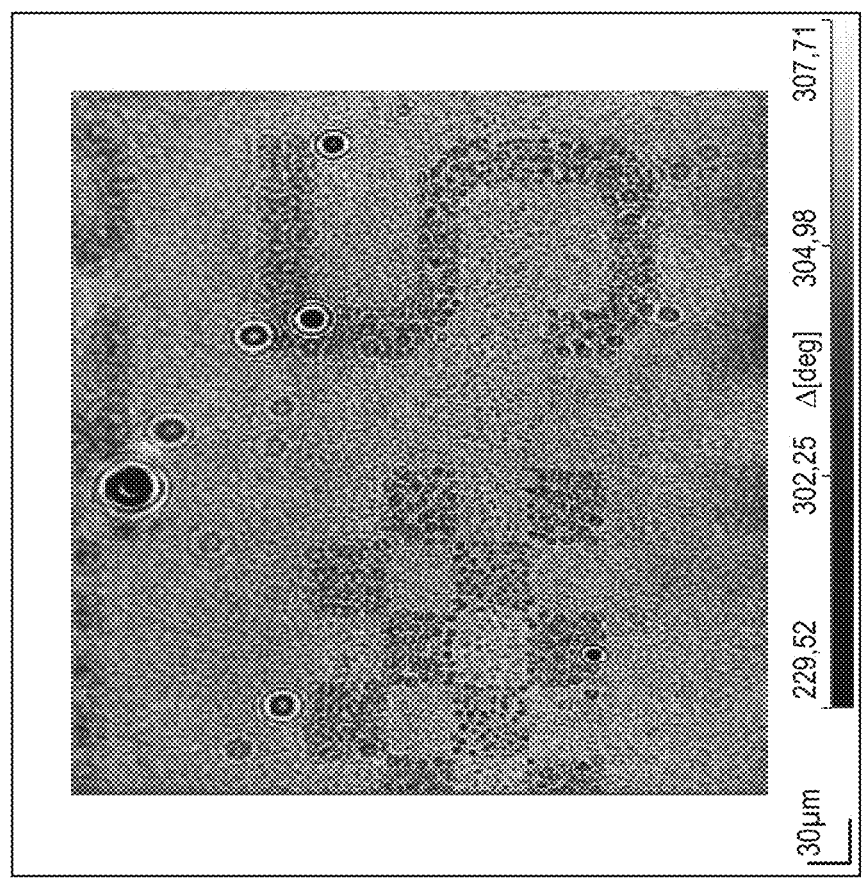

To test whether this monitoring process can be also possible on Quartz (QZ) substrates, a similar experiment was conducted on a Qz wafer with anti-reflective coating. It was found that the contrast on Qz degraded the signal to noise. FIG. 8 shows checkerboard patterns on Qz taken at 510 nm with a Xe source and filter. Left is center of wafer where the patterns may appear uniform. Right is edge of the wafer where there may be "islands". This laser source can be considered weak, so the noise can be high. However, FIG. 8 demonstrates the ability of the disclosed methods to measure the samples on Qz and also that this type of monitoring tool can identify defects early in the process. FIG. 8 shows the results of this experiment. The SNR can be lower on quartz but again, FIG. 8 shows that single base detection can be possible. A different laser source, a 488 nm laser may be used to increase the contrast.

Example 7: Demonstration of Post-Synthesis Verification

Figure 9:
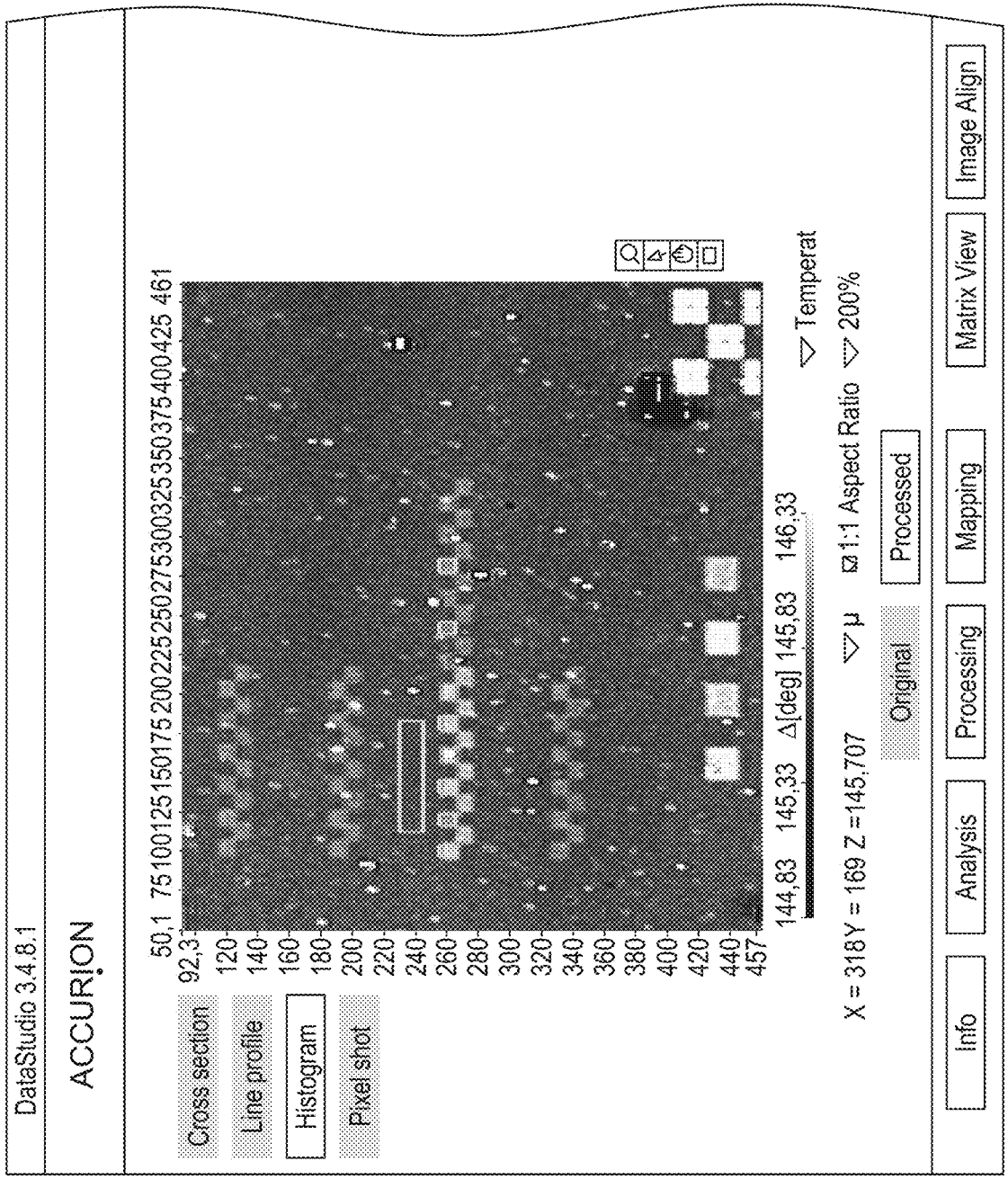
FIG. 9 shows another measurement of thickness when nucleotides are added to a quartz wafer according to a resolution test pattern.
Figure 9:
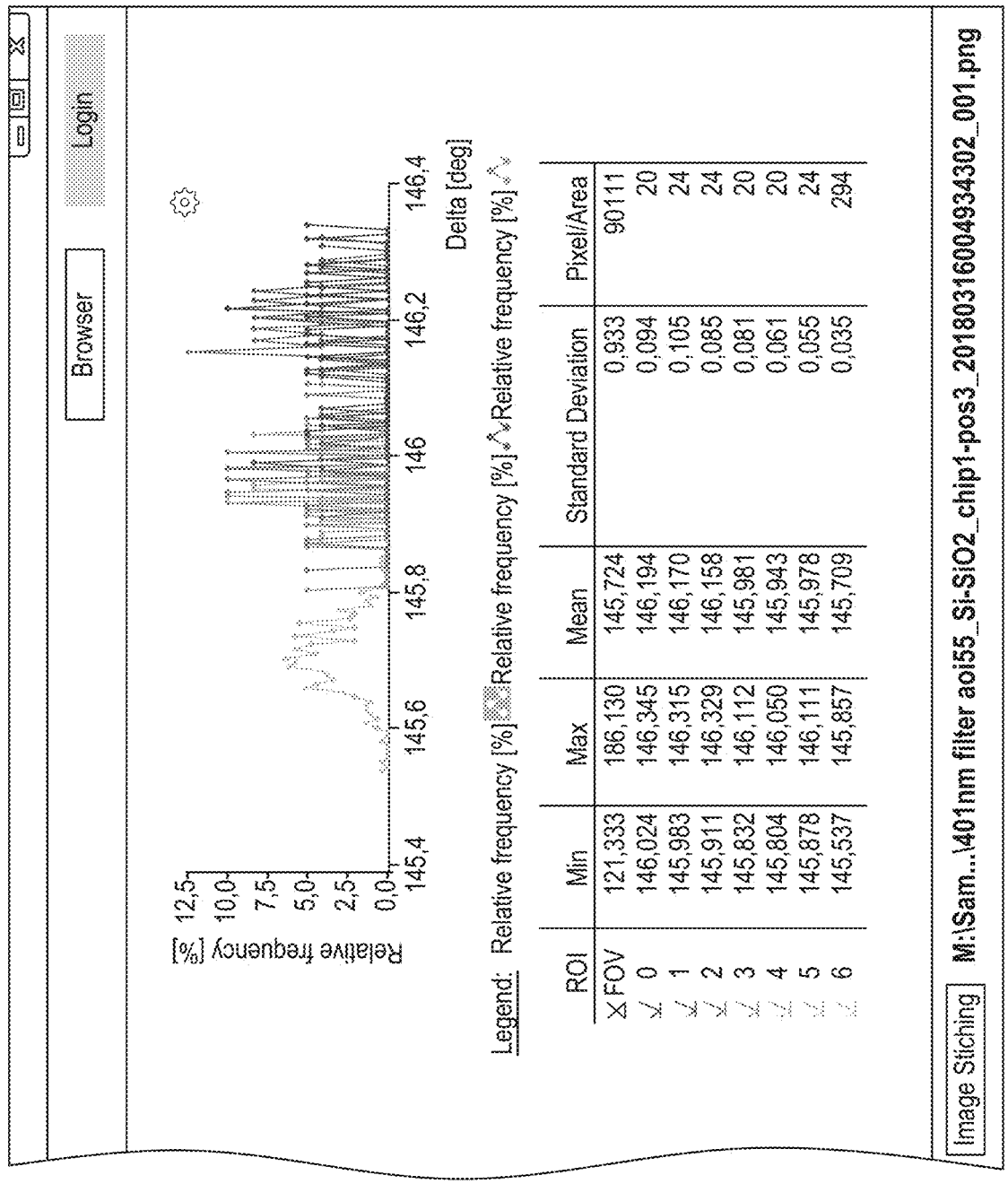

The power of this disclosed method can be shown in in-line monitoring. FIG. 9 may demonstration of post-synthesis verification. Each square in the staggered line pattern of square represents a mask layer of base added. The first 12 are added in one layer, and the second 12 do not have a layer underneath. Hence, for the staggered, 24-square feature, the 12 on the left are brighter than the 12 on the right (the exception may be layer 3, which has only one base). All bases can be shown as correctly added on this wafer because all squares are represented. This image was done after deprotection at 401 nm LED.

FIG. 9 also points out an issue that may appear more dramatic on Qz than on Si: the lumpiness of base addition. For this wafer of this experiment, the "lumpiness" problem occurred more at the edge than at the center of the substrate. This can be seen via assay results as well. Nonetheless, signals such as these can be available for process control, root cause investigations at the early steps of the manufacturing process where time and money can be saved.

As described above, FIG. 9 shows an actual wafer from the production line, with 12 or 24 staggered squares, each from a different mask layer, used to make sure a base was added at each layer. In this image, taken after deprotection, 401 nm incident wavelength LED was used. In the 24-square pattern, the 12 on the left are 2 bases thick (one base was added to all 12 in a single layer, then one each per position per layer), and the 12 on the right were simply one base per layer. This may verify that a base was added at each layer. In fact, with sufficient SNR, it may verify that the coupling went well. This type of measurement can be done after adding each base, in-line, when the ellipsometer tool is sensitive enough to distinguish bases with wavelengths that do not interfere with lithography, and when the measurement fast enough between different steps of the solid-phase synthesis.

As shown above, the tool in question, the EP4, can perform in-line monitoring. If one chooses not to have the entire field of view in focus, and can concentrate only one of either delta or psi, the EPE can be shown about 7:1 SNR on a single base at 648 nm LED in about 8 s, on protected oligos. With the automated stage, then, one can look at multiple spots per wafer in about 1 minute total analysis time. Longer image times up to about 1 minute per spot can provide better SNR or broader field of view results depending on whether an entire field of view is imaged, or what objective lens is used, the laser source used, and whether pixels can be binned. This may mean that for a given substrate, wavelength, angle of incidence, source bandwidth, etc. can all matter to analysis time and resulting SNR. Therefore, important factors may include: the ability to put multiple wavelengths on the tool (or a lamp with multiple filters to achieve a similar result), having a tool which can alter its angle of incidence, a tool which can alter objective lens easily, and even a tool which can have high flux sources (such as lasers) such that high magnification objectives can be used and still achieve reasonable signal at the detector during nulling. All the above consideration can help optimizing the measurement of interest. Hence, an optimal tool should have a variety of the features to achieve optimum results for various measurement questions.

There are other advantages to imaging ellipsometry. As noted above, the background can be collocated with the sample, in the same frame, and this can save time and improve the precision of the measurement, but not take any additional QC space for the chips. Scanning stages of point-source ellipsometry can do this as well, but at the cost of extreme time commitment to the sample, source, optics, electronics, and stage stability questions, etc., but ultimately increasing cycle time of the wafer if every layer type measurement is desired.

Secondly, true overlay on the wafer can be measured as one can measure with precision around the wafer exactly where one base was added via the prior layer. And another application can be in the early detection of problems on the wafers in the middle of the solid-phase synthesis.

In summary, methods for inline monitoring of patterned oligonucleotide synthesis is provided. In some embodiments, the method includes measuring every base or every few bases, such as 1, 2, 3, 4, or 5 bases (or layers) to detect synthesis or other abnormality using ellipsometry. Imaging ellipsometry can be in some embodiments. Various methods to make this method practical in a production environment can be provided and are described in the examples above.

The term "oligonucleotide" as used herein generally refers to a nucleotide chain. In some cases, an oligonucleotide is less than 200 residues long, e.g., between 15 and 100 nucleotides long. The oligonucleotide can comprise at least or about 1, 2, 3, 4, 5, 6, 7, 8, 9, 10, 15, 20, 25, 30, 35, 40, 45, or 50 bases. The oligonucleotides can be from about 3 to about 5 bases, from about 1 to about 50 bases, from about 8 to about 12 bases, from about 15 to about 25 bases, from about 25 to about 35 bases, from about 35 to about 45 bases, or from about 45 to about 55 bases. The oligonucleotide (also referred to as "oligo") can be any type of oligonucleotide (e.g., a primer). Oligonucleotides can comprise natural nucleotides, non-natural nucleotides, or combinations thereof.

The term "about" as used herein generally refers to +/−10%, 9%, 8%, 7%, 6%, 5%, 4%, 3%, 2%, or 1% of the designated amount.

As used herein, the term "substantially," when describing a relative value, a relative amount or a relative degree between two subjects, generally refers to within 80%, 81%, 82%, 83%, 84%, 85%, 86%, 87%, 88%, 89% 90%, 91%, 92%, 93%, 94%, 95%, 96%, 97%, 98%, 99%, 100%, 101%, 102%, 103%, 104%, 105%, 106%, 107%, 108%, 109%, or 110% of each other in value, amount or degree.

As used herein, open terms, for example, "comprise", "contain", "include", "including", "have", "having" and the like refer to comprising unless otherwise indicates.

The term "immobilization" as used herein generally refers to forming a covalent bond between two reactive groups. For example, polymerization of reactive groups is a form of immobilization. A covalent bond formation between two atoms, such as, for example, Carbon atom and Carbon atom, Carbon atom and hetero atom, and hetero atom and hetero atom, is an example of immobilization when the two atoms are from the two reactive groups, respectively.

As used herein, the term "substrate" or "solid substrate" generally refers to a substance, structure, surface, material, means, or composition, which comprises a nonbiological, synthetic, nonliving, planar, spherical or flat surface. The substrate may include, for example and without limitation, semiconductors, synthetic metals, synthetic semiconductors, insulators and dopants; metals, alloys, elements, compounds and minerals; synthetic, cleaved, etched, lithographed, printed, machined and microfabricated slides, devices, structures and surfaces; industrial polymers, plastics, membranes; silicon, silicates, glass, metals and ceramics; wood, paper, cardboard, cotton, wool, cloth, woven and nonwoven fibers, materials and fabrics; nanostructures and microstructures. The substrate may comprises an immobilization matrix such as but not limited to, insolubilized substance, solid phase, surface, layer, coating, woven or nonwoven fiber, matrix, crystal, membrane, insoluble polymer, plastic, glass, biological or biocompatible or bioerodible or biodegradable polymer or matrix, microparticle or nanoparticle. Other example may include, for example and without limitation, monolayers, bilayers, commercial membranes, resins, matrices, fibers, separation media, chromatography supports, polymers, plastics, glass, mica, gold, beads, microspheres, nanospheres, silicon, gallium arsenide, organic and inorganic metals, semiconductors, insulators, microstructures and nanostructures. Microstructures and nanostructures may include, without limitation, microminiaturized, nanometer-scale and supramolecular probes, tips, bars, pegs, plugs, rods, sleeves, wires, filaments, and tubes. The substrate can exist as one or more particles, strands, precipitates, gels, sheets, tubing, spheres, containers, capillaries, pads, slices, films, plates, slides, or semiconductor integrated chips, for example. The substrate can be flat or can take on alternative surface configurations. For example, the substrate can contain raised or depressed regions on which synthesis or deposition takes place. In some examples, the substrate can contain raised or depressed regions in different 3-D shapes and/or heights. In some examples, the substrate can comprise a plurality of features. In some examples, the substrate can comprise a topographical pattern and the topographical can comprise a group of troughs, a group of bars, a group of pillars, a group of well, or a combination thereof. In some cases, the topographical pattern can be formed by at least two different materials, for example, a silicon chip covered with a layer of photoresist, or a quartz chip covered with a hydrogel, etc. In some examples, the substrate can contain raised or depressed regions in substantially the same 3-D shapes and/or heights. In some examples, the substrate can be chosen to provide appropriate light-absorbing characteristics. For example, the substrate can be a polymerized Langmuir Blodgett film, functionalized glass (e.g., controlled pore glass), silica, titanium oxide, aluminum oxide, indium tin oxide (ITO), Si, Ge, GaAs, GaP, $SiO_2$, $SiN_4$, modified silicon, the top dielectric layer of a semiconductor integrated circuit (IC) chip, or any one of a variety of gels or polymers such as (poly) tetrafluoroethylene, (poly)vinylidenedifluoride, polystyrene, polycarbonate, polydimethylsiloxane (PDMS), poly(methyl methacrylate) (PMMA), polycyclicolefins, or combinations thereof.

The substrates can comprise polymer coatings or gels, such as a polyacrylamide gel or a PDMS gel. Gels and coatings can additionally comprise components to modify their physicochemical properties, for example, hydrophobicity. For example, a polyacrylamide gel or coating can comprise modified acrylamide monomers in its polymer structure such as ethoxylated acrylamide monomers, phosphorylcholine acrylamide monomers, betaine acrylamide monomers, and combinations thereof.

As used herein, the term "nucleic acid" generally refers to a polymer comprising one or more nucleic acid subunits or nucleotides. A nucleic acid may include one or more subunits selected from adenosine (A), cytosine (C), guanine (G), thymine (T) and uracil (U), or variants thereof. A nucleotide can include A, C, G, T or U, or variants thereof. A nucleotide can include any subunit that can be incorporated into a growing nucleic acid strand. Such subunit can be an A, C, G, T, or U, or any other subunit that is specific to one or more complementary A, C, G, T or U, or complementary to a purine (i.e., A or G, or variant thereof) or a pyrimidine (i.e., C, T or U, or variant thereof). A subunit can enable individual nucleic acid bases or groups of bases (e.g., AA, TA, AT, GC, CG, CT, TC, GT, TG, AC, CA, or uracil-counterparts thereof) to be resolved. In some examples, a nucleic acid is deoxyribonucleic acid (DNA) or ribonucleic acid (RNA), or derivatives thereof. A nucleic acid may be single-stranded or double-stranded.

As used herein, the term "adjacent" or "adjacent to," includes "next to," "adjoining," and "abutting." In one example, a first location is adjacent to a second location when the first location is in direct contact and shares a common border with the second location and there is no space between the two locations. In some cases, the adjacent is not diagonally adjacent.

The term "sequencing," as used herein, generally refers to methods and technologies for determining the sequence of nucleotide bases in one or more polynucleotides. The polynucleotides can be, for example, nucleic acid molecules such as deoxyribonucleic acid (DNA) or ribonucleic acid (RNA), including variants or derivatives thereof (e.g., single stranded DNA). Sequencing can be performed by various systems currently available, such as, without limitation, a sequencing system by ILLUMINA®, Pacific Biosciences (PACBIO®), Oxford NANOPORE®, or Life Technologies (ION TORRENT®). Alternatively or in addition, sequencing may be performed using nucleic acid amplification, polymerase chain reaction (PCR) (e.g., digital PCR, quantitative PCR, or real time PCR), or isothermal amplification. Such systems may provide a plurality of raw genetic data corresponding to the genetic information of a subject (e.g., human), as generated by the systems from a sample provided by the subject. In some examples, such systems provide sequencing reads (also "reads" herein). A read may include a string of nucleic acid bases corresponding to a sequence of a nucleic acid molecule that has been sequenced. In some situations, systems and methods provided herein may be used with proteomic information.

The term "nucleic acid sequence" or "nucleotide sequence" as used herein generally refers to nucleic acid molecules with a given sequence of nucleotides, of which it may be desired to know the presence or amount. The nucleotide sequence can comprise ribonucleic acid (RNA) or DNA, or a sequence derived from RNA or DNA. Examples of nucleotide sequences are sequences corresponding to natural or synthetic RNA or DNA including genomic DNA and messenger RNA. The length of the sequence can be any length that can be amplified into nucleic acid amplification products, or amplicons, for example, up to about 20, 50, 100, 200, 300, 400, 500, 600, 700, 800, 1,000, 1,200, 1,500, 2,000, 5,000, 10,000 or more than 10,000 nucleotides in length, or at least about 20, 50, 100, 200, 300, 400, 500, 600, 700, 800, 1,000, 1,200, 1,500, 2,000, 5,000, 10,000 or 10,000 nucleotides in length.

As used herein, the term "hydrogel" generally refers to a gel in which the swelling agent is water. The term "gel" refers to a non-fluid colloidal network or polymer network that is expanded through its volume by a fluid. The term "swelling agent" is a fluid used to swell a gel or network. For example, water can be a swelling agent for a hydrogel. The hydrogels of the present disclosure may be prepared by polymerization of one or more acrylamide-functionalized monomers. For example, an acrylamide tail can also be bonded to the surface of a substrate, for example, a quartz slide. Then a solution containing acrylamide monomers can be brought in contact with the surface bonded with acrylamide tails. Then the poured solution can be subject to polymerization of acrylamide monomers and the acrylamide tails such that a hydrogel can be formed. In some cases, the hydrogel of the present disclosure comprises polyacrylamides. In some cases, the hydrogel of the present disclosure comprises crossed lined polyacrylamides. In some cases, the hydrogel of the present disclosure comprises about 0.5%, 1%, 2%, 3%, 4%, 5%, 6%, 7%, 8%, 9%, 10%, 11%, 12%, 13%, 14%, 15%, 16%, 17%, 18%, 19%, or 20% of polyacrylamides in weight. In some cases, the hydrogel can be obtainable by combining acrylamide and methylene bis-acrylamide. The polymerization reaction can be radical initiated by an initiator. The hydrogel can be obtained by combining acrylamide and methylene bis-acrylamide is in a molar ratio of 150:1 to 1000:1 in the presence of a radical initiator. Methylene bis-acrylamide can provide cross-linking between polymer chains and the molar ratio may be varied to provide various cross-linking densities of the hydrogel. The conditions for obtaining the hydrogel may be modified. Ammonium persulfate (AMPS) can be used as an initiator for the polymerization.

As used herein a photo nucleoside phosphoramidite or photoamidite, including photo-T, can be a nucleoside analog/reagent that comprises (i) a photo-sensitive protecting group on the nucleoside, for example, on the 5' hydroxyl group, and (ii) a phosphoramidite moiety on the 3' hydroxyl, as shown below:

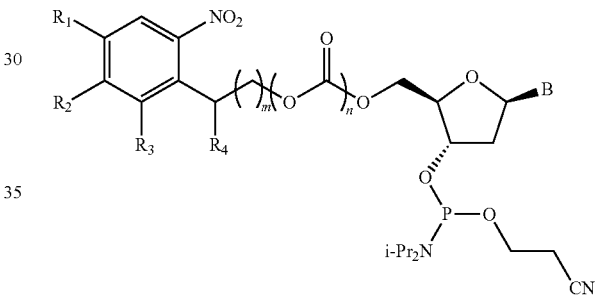

wherein:
each of $R_1$, $R_2$ and $R_3$ is independently H, alkyl, alkoxy, or aryl, or any two of $R_1$, $R_2$ and $R_3$ together with the atoms bonded thereto form a fused ring with the benzene ring bearing the nitro group;
$R_4$ is H, alkyl or aryl;
m is 0 or 1;
n is 0 or 1;
B is protected nucleic acid heterocyclic bases: $A^{pg}$, $C^{pg}$, $G^{pg}$, T, U;
A is adenine;
C is cytosine;
G is guanine;
T is thymine;
U is uracil; and
pg is independently a protecting group or protecting groups on exocyclic nitrogen atoms of heterocyclic bases A, C, G, T or U.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of monitoring a solid-phase reaction on a surface of a substrate, comprising:
   (a) taking a first measurement of a property of the surface at a plurality of positions on the surface before a first reaction on the surface;
   (b) taking a second measurement of the property of the surface at the plurality of positions on the surface after the first reaction on the surface; and
   (c) determining a first quality of the first reaction on the surface based on the first measurement and the second measurement,
   wherein the first measurement and the second measurement are measured by an ellipsometer, and
   wherein the first quality of the first reaction is (1) yield of the first reaction at each of the plurality of the positions, (2) uniformity of the first reaction at each of the plurality of the positions, (3) whether the first reaction provides the correct product at each of the plurality of the positions, or (4) whether the first reaction is conducted at each of the plurality of the positions.

2. The method of claim 1, further comprising:
   (d) conducting a second reaction on the surface;
   (e) taking a third measurement of the property of the surface at the plurality of positions on the surface after the second reaction on the surface; and
   (f) determining a second quality of the second reaction on the surface based on the second measurement and the third measurement,
   wherein the third measurement is measured by the ellipsometer, and
   wherein the second quality of the second reaction is (1) yield of the second reaction at each of the plurality of the positions, (2) uniformity of the second reaction at each of the plurality of the positions, (3) whether the second reaction provides the correct product at each of the plurality of the positions, or (4) whether the second reaction is conducted at each of the plurality of the positions.

3. The method of claim 1, wherein the solid-phase reaction is for the synthesis of a polymer, a polypeptide, an oligosaccharide, or an oligonucleotide.

4. The method of claim 3, wherein the solid-phase reaction is for the synthesis of the oligonucleotide.

5. The method of claim 1, wherein the first measurement is thickness, and wherein the second measurement is thickness.

6. The method of claim 1, wherein the determining in (c) is based on a first difference between the first measurement and the second measurement, and wherein the first difference (1) has a first signal to noise ratio (SNR) better than 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, or 30:1, or (2) has the first signal to noise ratio (SNR) of about 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, or 30:1.

7. The method of claim 2, wherein the determining in (f) is based on a second difference between the second measurement and the third measurement, and wherein the second difference (1) has a second signal to noise ratio (SNR) better than 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, or 30:1, or (2) has the second signal to noise ratio (SNR) of about 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, or 30:1.

8. The method of claim 6, wherein the first SNR can be improved by using a laser source of a different wavelength.

9. The method of claim 4, wherein the first reaction uses dimethoxytrityl (DMT)-related chemistry or photo chemistry.

10. The method of claim 2, wherein the second reaction uses dimethoxytrityl (DMT)-related chemistry or photo chemistry.

11. The method of claim 2, wherein the first reaction and the second reaction use dimethoxytrityl (DMT)-related chemistry, or wherein the first reaction and the second reaction use photo chemistry.

12. The method of claim 2, wherein the solid-phase reaction continues based on the first quality and/or the second quality.

13. The method of claim 1, wherein the first measurement and the second measurement are taken in-line of the solid-phase reaction on the surface.

14. The method of claim 1, wherein the first measurement and the second measurement are taken in-situ of the solid-phase reaction on the surface.

15. The method of claim 1, wherein the first measurement and the second measurement are taken in real-time of the solid-phase reaction on the surface.

16. The method of claim 1, wherein the ellipsometer is an imaging ellipsometer.

17. The method of claim 6, wherein the first SNR is improved by varying wavelength, angle of incidence, or source bandwidth for the ellipsometer.

* * * * *